(No Model.)

W. E. JACOBS.
SEAT FOR AGRICULTURAL MACHINES.

No. 350,135. Patented Oct. 5, 1886.

Witnesses:
B. C. Fenwick.
R. L. Fenwick.

Inventor:
William E. Jacobs
by his atty

UNITED STATES PATENT OFFICE.

WILLIAM E. JACOBS, OF COLUMBUS, OHIO.

SEAT FOR AGRICULTURAL MACHINES.

SPECIFICATION forming part of Letters Patent No. 350,135, dated October 5, 1886.

Application filed August 3, 1885. Serial No. 173,471. (No model.)

*To all whom it may concern:*

Be it known that I, WILLIAM E. JACOBS, a citizen of the United States, residing at Columbus, in the county of Franklin and State of Ohio, have invented certain new and useful Improvements in Seats for Agricultural Machines; and I do hereby declare the following to be a full, clear, and exact description of the invention, such as will enable others skilled in the art to which it appertains to make and use the same.

Figure 1:
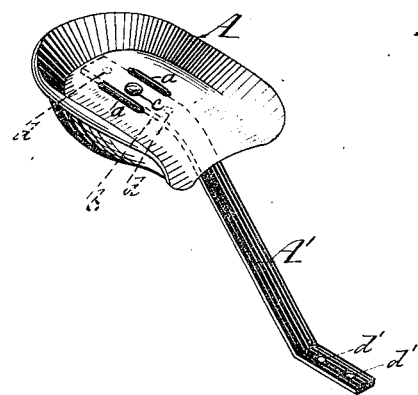
Figure 2:
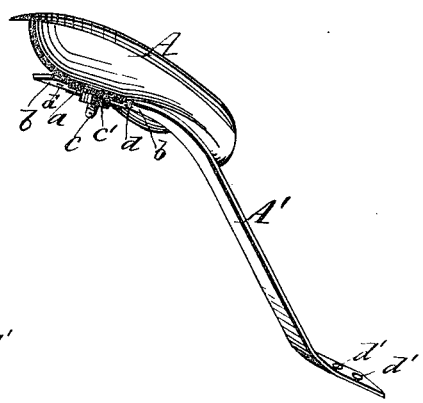
Figure 3:
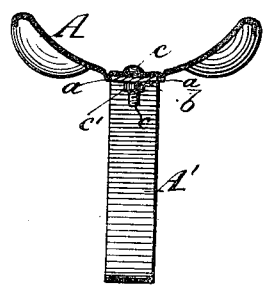

In the accompanying drawings, Figure 1 is a perspective view of my improved seat for agricultural machines, the same representing the position for use which it will occupy when attached to an agricultural implement or machine. Fig. 2 is a perspective view showing a portion of the under side of the seat; and Fig. 3 is a central transverse section of the seat, looking from the rear thereof.

The object of my invention is the production of a cheap and durable seat from a single piece of metal, the same being stamped into the form shown in a properly-constructed die, either while the metal is heated or in a cool state; and the particular improvement which I wish to secure by Letters Patent consists in the forming of two corrugations or crimp-ridges on and integral with the sheet-metal seat and intermediate of its front and rear portions, as shown, in the act of stamping the seat into form, said corrugations serving to fasten the seat to a seat-standard, the same as an ordinary cast-iron seat is usually held, and thus do away with an additional piece—to wit, a seat-block—the further advantage being that the said corrugations serve to strengthen the sheet metal at those points, as well as afford means for a proper attachment of the seat-standard to the seat at a point practically central of said seat, thus affording great yielding movement to the standard and ease to the occupant of the seat.

In the drawings, A indicates the seat proper, and $a$ $a$ short corrugations or crimps stamped in the sheet metal of the seat about midway of the front and rear of the seat, or at a point practically midway of said seat, in the act of constructing the same, and between which corrugations the rear end, $b$, of the seat-standard A' is inserted, as shown, and confined by a headed screw-bolt, $c$, and screw-nut $c'$, as shown, said bolt being made to pass through a hole in the seat-standard and a hole in the seat, as indicated in the figures, so that upon screwing up the nut $c'$ upon the bolt $c$ the seat proper, A, and seat-standard A' will be securely and fixedly attached together.

In Fig. 2, $d$ indicates the holes in the seat-standard, through one of which the bolt $c$ may be made to pass in attaching the seat A to the seat-standard A', and $d'$ holes in the lower end of the seat-standard for attaching the same in the usual manner to the machine upon which the seat is to be used.

Of course, I contemplate to use the seat on wagons or other vehicles whenever it may to advantage be applied.

I am aware that sheet-metal seats have been used with seat-blocks in agricultural machines, and also that cast-metal seats with lugs integral with the seat have been used.

I claim—

A vehicle-seat which comprises in its construction a body portion, A, having corrugations $a$ running lengthwise of the seat, forming an open groove on the under side of the seat, into which the seat-standard can be inserted, so as to be properly fastened by a bolt, and when fastened will have contact against the sides of the corrugations, and also that portion of the under side of the seat which is between said corrugations, the whole being formed of stamped or swaged sheet metal, and said corrugations staying the seat positively against lateral movement, substantially as described.

In testimony whereof I affix my signature in presence of two witnesses.

WILLIAM E. JACOBS.

Witnesses:
J. C. RICHARDS,
L. S. STOVER.